April 8, 1952 H. BRAMMER 2,592,238
PEDAL REFLECTOR
Filed Dec. 1, 1947 2 SHEETS—SHEET 1
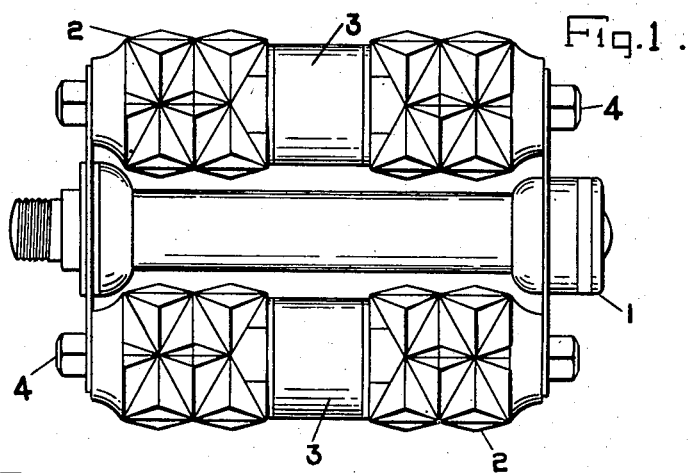
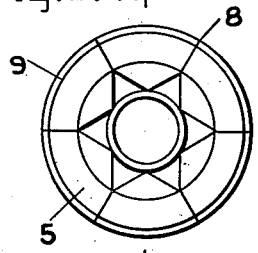
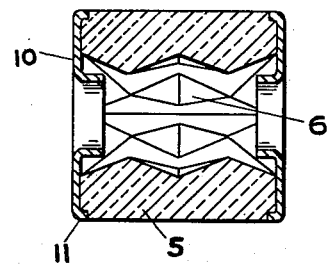
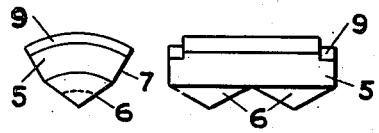
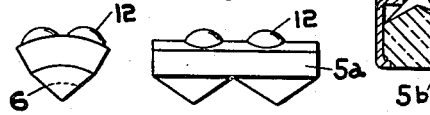
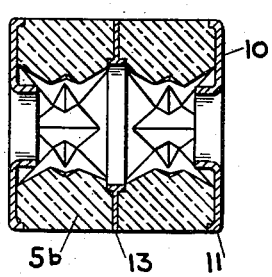
Inventor:
Harry Brammer,
By: Pierce, Scheffler & Parker,
Attorneys.

April 8, 1952     H. BRAMMER     2,592,238
PEDAL REFLECTOR

Filed Dec. 1, 1947     2 SHEETS—SHEET 2

Inventor:
Harry Brammer,
By Pierce, Scheffler & Parker,
Attorneys

Patented Apr. 8, 1952

2,592,238

UNITED STATES PATENT OFFICE 2,592,238

PEDAL REFLECTOR

Harry Brammer, Kirkstall, Leeds, England

Application December 1, 1947, Serial No. 789,005
In Great Britain December 9, 1946

6 Claims. (Cl. 88—81)

This invention relates to reflectors incorporated in or fixed to the pedals of cycles or like machines. Hitherto reflectors have been combined with both "rat-trap" or "rubber" pedals by means of a holder or clip means and have proved efficient in use. It has also been proposed to build the reflector into the rubber tread members during their formation.

The main object of this invention is to provide reflector means for association with tread members of the cycle pedal.

According to the present invention a reflector device is constructed to form part of the tread member of the pedal and be secured in position by the tread member retaining bolt or equivalent means. The reflector device may comprise a washer-like element to be located in the normal length of the tread member. Devices may be located at two more points.

The reflector device whether in the form of an insert or carrier may be furnished by facets and/or other reflective means within itself. The reflector may comprise coloured or other material or be transparent with a coloured reflector within it. Moreover the outer face or periphery of the reflector means may be of plain or facetted shape or have rounded or other protuberances or of other formation, for reflective purposes.

Referring now to the accompanying drawings in which embodiments of the invention are shown:

Fig. 1 is a plan view of a cycle pedal constructed according to the invention;

Fig. 2 is an end view of a segmental reflector device with its end washer removed;

Fig. 3 is a sectional elevation on line A—A of Fig. 2;

Fig. 4 is an end view of a reflector segment;

Fig. 5 is a side view of a reflector segment;

Fig. 6 is an end view of a modified segment;

Fig. 7 is a side view of a modified segment;

Fig. 8 is a sectional elevation of a sectional reflector device;

Figure 9:
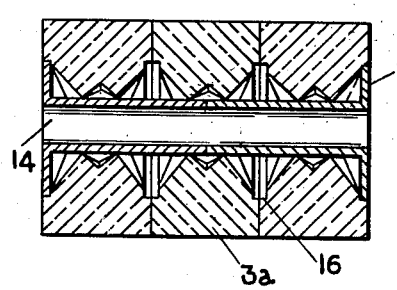
Fig. 9 is a sectional elevation of a sectional reflector device on a split sleeve.

In the particular embodiment of this invention shown in Fig. 1, a pedal 1 is adapted to be fitted with two rubber tread members 2, each of which is fabricated from two tread parts and one (or more) reflective device 3. Each reflective device comprises a washer of circular (or other) shape with a central hole to enable it to be fitted on to the usual tread retaining bolt 4. The washer may have a plain centre hole or such hole may be shaped to provide facets for light reflective purposes within the body of the washer. Such facets may be treated to have a reflective surface, have such a surface associated therewith or the reflective surface may be fitted on to the bolt in the form of a reflective sleeve. Alternatively, the bolt itself may be chromium plated or otherwise adapted as a reflective surface. The washers may be formed from glass, a thermo-setting plastic, or other transparent material capable of acting as a reflector. More than one insert of reflector devices may be incorporated in the normal over-all length of the tread member, i. e., there may be two reflector devices with one tread member in the centre, or, there may be more than two tread members with two or more reflector devices between them. Each reflector device may in itself form each reflector insert, or the reflector insert may be built up of two or more reflector washers. Each of such washers could be concave or countersunk on its side faces for reflective purposes and may even have such surfaces treated with a reflective medium or have reflective means associated therewith.

A convenient way of manufacturing the reflector devices is to mould them in segments which can be fitted together about an axial line to form circular washer-like elements. In Figs. 2–5 is shown one arrangement wherein segments 5 have facets 6 on their inner faces, have tapering side faces 7 (to abut one another in radial joints 8 when assembled) and are recessed at 9 on their peripheral edges. The facets 6, and if desired the side faces 7, may be silvered. A number of the segments, six are shown although an element may comprise two or more, are assembled and end retaining washers 10 (they can have reflective inner faces) are fitted. Each latter washer has a lip 11 to enter the recesses 9 (although the latter may be dispensed with and the lips simply embrace the rim of the segments) to hold the segments, and a central boss is provided for the bolt 4.

In Figs. 6 and 7 a segment 5a is shown with external protuberances 12 of semi-spherical formation to improve the reflective properties of a washer-like element which they form when assembled. They can be silvered as aforesaid or untreated as desired and held together by end washers 10. Any of the segments could be secured together permanently by an adhesive, or a welding process. Moreover, the protuberances, or the periphery of the segments 5 may have facets.

A slightly modified arrangement is shown in Fig. 8 wherein two reflective segmental washer-like elements 5b with end washers 10 are held in alignment by a centre washer 13. Alternatively, two of the aforesaid segmental elements are mounted side by side on the bolt 4.

Figure 10:
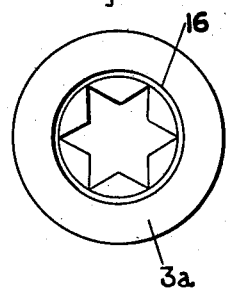
Fig. 10 is an end view of one of the reflectors.

A further arrangement is shown in Figs. 9 and 10 wherein three (there may be two or more) reflector washers 3a are mounted on a central split carrier sleeve 14 having end flanges 15 to retain the washers 3a in position. All these reflective washers have a recess 16 on each face capable of receiving a flange 15 so as to be universal and require only one type of mould.

Figure 11:
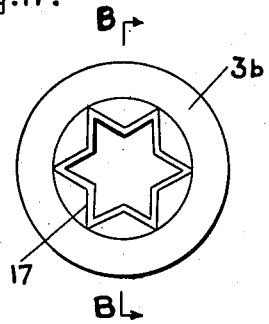
Fig. 11 is an end view of a modified reflector device.
Figure 12:
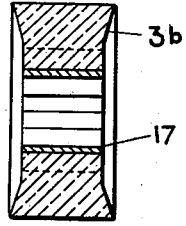
Fig. 12 is a sectional elevation on line B—B of Fig. 11.

In a modification shown in Figs. 11 and 12, each reflective device 3b may have a reflective element 17 (or elements) moulded therein or forced there into to form a liner. Or a plate or plates may be arranged radially or at any other desired angle in the washer. Such a reflective element is facetted, say by being crimped or fluted as shown, or otherwise shaped to improve its reflective qualities.

The above reflective washers may conform to the cross-sectional shape of the tread members or be of a different shape, e. g., when circular, and may be flush with or slightly below the actual tread surfaces. The transparent material, such as a thermo-setting plastic, glass or the like, may be uncoloured or coloured as desired. If desired the reflective means may be adapted to give a coloured effect to the reflector devices. Furthermore, the washer-like device may have detachable reflector studs or other means affixed to its periphery or moulded thereon.

What I claim is:

1. A reflector cycle pedal comprising a pedal spindle, two transverse frame bars mounted rotatably on the spindle adjacent the ends thereof, two tread carrying bolts extending between said frame bars one on each side of and parallel with said spindle, at least one tread block having an axial center bore mounted on each of said bolts with the latter extending through the center bore thereof and at least one tubular reflector member having a center bore mounted on each of said bolts with the latter extending through the center bore thereof, each said reflector member being located between said frame bars coaxial with the respective tread block and forming a make-up part of the tread portion of the pedal.

2. A reflector pedal according to claim 1 in which tread blocks are mounted on opposite end portions of each bolt and a reflector member is mounted intermediate and in end to end relation with respect to the tread blocks on each bolt.

3. A reflector pedal according to claim 1 in which the tread blocks have a greater radial cross-sectional dimension than that of the reflector members whereby to protect the outer surface of the reflector elements against damage.

4. A reflector pedal according to claim 1 in which the reflector members each comprise a plurality of separate coaxial segments and end retaining means engaging the segments to hold the same assembled together in tubular form, said end retaining means having an axial bore receiving said bolts.

5. A reflector pedal according to claim 4 wherein the end retaining means comprise a pair of metallic washer-like members having inturned peripheral lips embracing the ends of the assembled segments.

6. A reflector pedal according to claim 1 in which the reflector members each comprise a plurality of concentric washer-like elements having faceted inner surfaces and arranged side by side, a tubular core member extending through the washer like elements and end flanges on the tubular core for retaining the washer-like elements on the core member, said core member fitting on the carrying bolt.

HARRY BRAMMER.

REFERENCES CITED

The following references are of record in the file of this patent:

UNITED STATES PATENTS

| Number | Name | Date |
| --- | --- | --- |
| 1,432,392 | Heise | Oct. 17, 1922 |
| 1,990,223 | Cochran | Feb. 5, 1935 |
| 2,151,144 | Penny et al. | Mar. 21, 1939 |
| 2,315,380 | Yeater et al. | Mar. 30, 1943 |

FOREIGN PATENTS

| Number | Country | Date |
| --- | --- | --- |
| 17,058 | Great Britain | Jan. 1, 1914 |
| 668,458 | Germany | Dec. 3, 1938 |
| 508,910 | Great Britain | July 7, 1939 |
| 705,215 | Germany | Apr. 21, 1941 |
| 68,347 | Norway | Oct. 2, 1944 |